United States Patent
Loenne et al.

(10) Patent No.: US 10,911,140 B2
(45) Date of Patent: *Feb. 2, 2021

(54) MULTI-WAVELENGTH POWER SENSING

(71) Applicant: VIAVI SOLUTIONS DEUTSCHLAND GMBH, Eningen Unter Achalm (DE)

(72) Inventors: Joachim Loenne, Pliezhausen (DE); Wolfgang Moench, Neuffen (DE)

(73) Assignee: VIAVI SOLUTIONS DEUTSCHLAND GMBH, Eningen Unter Achalm (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/457,221

(22) Filed: Jun. 28, 2019

(65) Prior Publication Data

US 2020/0007229 A1 Jan. 2, 2020

Related U.S. Application Data

(63) Continuation of application No. 16/024,023, filed on Jun. 29, 2018, now Pat. No. 10,382,126.

(51) Int. Cl.
*H04B 10/079* (2013.01)
*H04B 10/69* (2013.01)
*H04J 14/02* (2006.01)
*H04B 10/27* (2013.01)

(52) U.S. Cl.
CPC ....... *H04B 10/07955* (2013.01); *H04B 10/27* (2013.01); *H04B 10/691* (2013.01); *H04J 14/0221* (2013.01)

(58) Field of Classification Search
CPC .................................................. H04J 14/0221
USPC ........................................................... 398/34
See application file for complete search history.

(56) References Cited

U.S. PATENT DOCUMENTS

| | | | |
|---|---|---|---|
| 9,379,813 B2* | 6/2016 | Prause | H04B 10/0793 |
| 2001/0048537 A1 | 12/2001 | Sussman et al. | |
| 2004/0197099 A1* | 10/2004 | Kai | H04B 10/572 |
| | | | 398/85 |
| 2015/0043908 A1* | 2/2015 | Prause | H04B 10/07955 |
| | | | 398/34 |
| 2016/0099792 A1* | 4/2016 | Gao | H04J 14/0257 |
| | | | 398/69 |
| 2017/0085318 A1* | 3/2017 | Ruchet | H04B 10/07955 |

(Continued)

FOREIGN PATENT DOCUMENTS

EP 3148098 A1 3/2017
WO 2005/036783 A1 4/2005

*Primary Examiner* — Dalzid E Singh
(74) *Attorney, Agent, or Firm* — Mannava & Kang, P.C.

(57) ABSTRACT

In some examples, a multi-wavelength power meter may include a first coupler to separate optical signals from an optical line terminal and an optical network terminal to ascertain a reduced percentage of total power related to the optical signals. A second coupler may receive the separated optical signals, combine the separated optical signals, and output the combined optical signals to an optical fiber. A filter may be communicatively connected to the optical fiber to isolate at least one specified wavelength or wavelength range of the combined optical signals. A photodiode may be communicatively connected to the filter for power measurement of the at least one specified wavelength or wavelength range.

17 Claims, 4 Drawing Sheets

(56) References Cited

U.S. PATENT DOCUMENTS

2018/0054272 A1* 2/2018 Kim ................ H04B 10/69
2018/0131436 A1* 5/2018 Son ................ H04B 10/0779

* cited by examiner

MULTI-WAVELENGTH POWER SENSING

PRIORITY

This application is a Continuation of commonly assigned and co-pending U.S. patent application Ser. No. 16/024,023, filed Jun. 29, 2018, the disclosure of which is hereby incorporated by reference in its entirety.

BACKGROUND

A power meter may be used to measure the power in an optical signal. For example, a power meter may be used to measure the power in an optical signal transmitted via an optical fiber. The power meter may include a sensor to measure the power level of the optical signal. Further, the power meter may include a display unit to display measured optical power, and a wavelength associated with the optical signal.

BRIEF DESCRIPTION OF DRAWINGS

Features of the present disclosure are illustrated by way of examples shown in the following figures. In the following figures, like numerals indicate like elements, in which.

DETAILED DESCRIPTION

Figure 1:
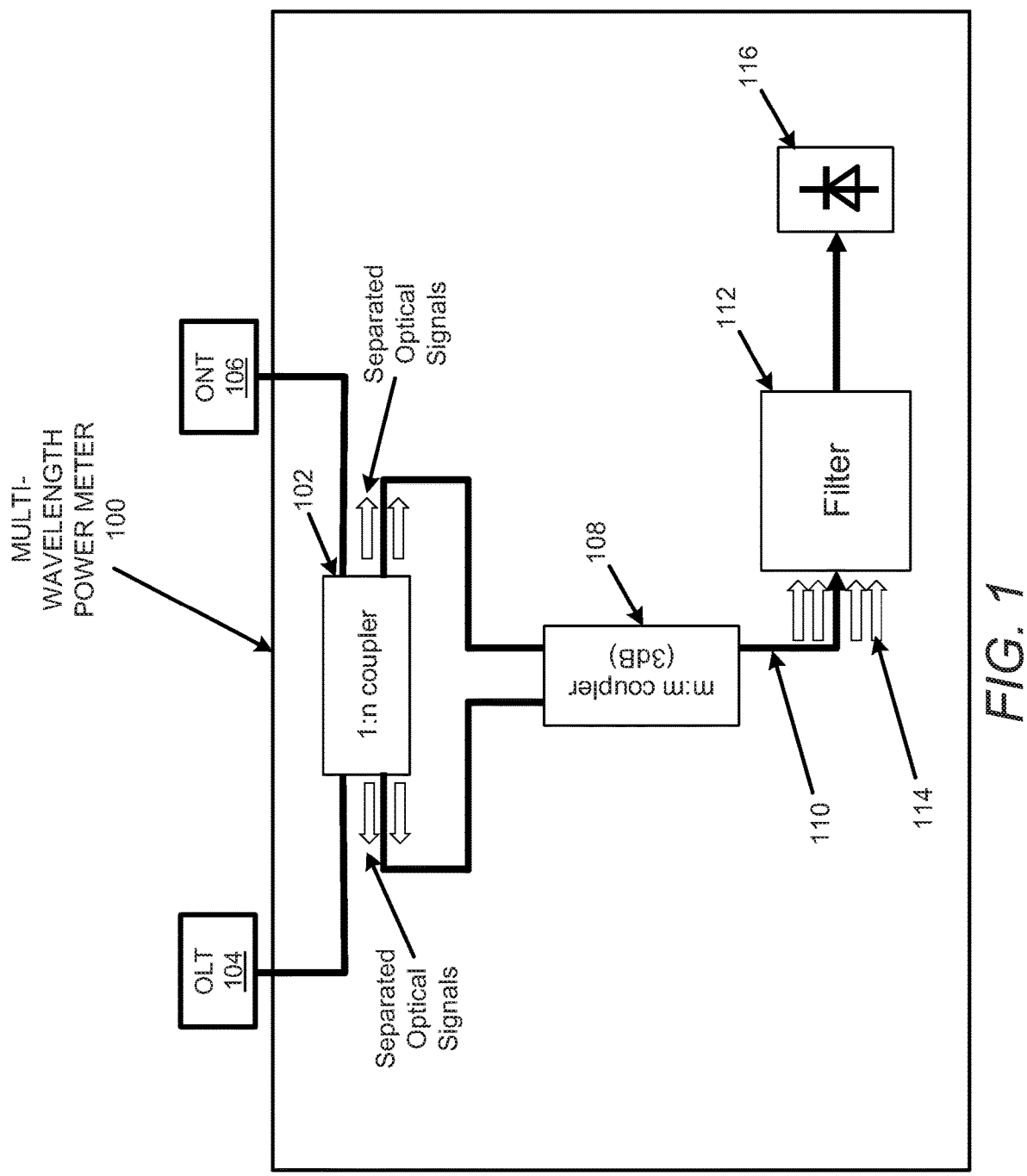
FIG. 1 illustrates an architecture of a multi-wavelength power meter, according to an example of the present disclosure.

For simplicity and illustrative purposes, the present disclosure is described by referring mainly to examples thereof. In the following description, details are set forth in order to provide an understanding of the present disclosure. It will be readily apparent however, that the present disclosure may be practiced without limitation to these details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

A multi-wavelength power meter is disclosed herein and may include a first coupler to separate optical signals from an optical line terminal and an optical network terminal to ascertain a reduced percentage of total power related to the optical signals. A second coupler may receive the separated optical signals, combine the separated optical signals, and output the combined optical signals to an optical fiber. A filter may be communicatively connected to the optical fiber to isolate at least one specified wavelength or wavelength range of the combined optical signals. A photodiode may be communicatively connected to the filter for power measurement of the at least one specified wavelength or wavelength range.

With respect to the multi-wavelength power meter as disclosed herein, a passive optical network (PON) may distribute optical services on an optical layer. The PON may represent a distribution network that is based on passive optics using optical fibers and distributing services on the optical layer. For the PON, examples of services may include data, video overlay, etc., where the data may include Internet data, voice over Internet protocol (IP) data, and generally, digital data. The PON may also be referred to as a fiber to the home (FTTH) network. The PON may include an optical line terminal (OLT), which may reside at a central office, and an optical network terminal (ONT), which may reside at a customer site. The OLT and ONT may provide for electrical to optical, or optical to electrical conversion. For example, at the OLT, a digital signal in the electrical domain may be translated to optical pulses in the optical domain, where the optical pulses may be transmitted on an optical fiber downstream to a customer. At the customer site, the ONT may translate the optical signal to the electrical domain, and place the resulting information, for example, into a personal computer, a telephone, or another such device.

For a PON, a downstream signal direction may represent movement of an optical signal from a central office to a customer. An upstream signal direction may represent movement of an optical signal from a customer to a central office. The downstream signal may be distributed to each customer in an identical manner. For example, a downstream signal may be divided into multiple branches (e.g., 64 or 128 customers), and the same signal may be distributed to multiple customers. Each fiber to a customer may include the same information downstream. Thus, a downstream direction may be denoted as a broadcasting signal.

For the upstream direction, such as where a service provided to a customer may include Internet service, an upstream channel may be needed. In this regard, each customer may be allotted a time slot for the upstream signal to send data. This is because not all customers may need to send data at the same time.

Each of the aforementioned optical signal transmissions to or from a customer may include different classifications. For example, optical signals transmitted over optical fibers may include different classifications in terms of attributes such as length, loss, speed, etc. For example, Gigabit-capable passive optical network (GPON), 10 Gigabit symmetrical PON (X GS-PON), next generation-passive optical network (NG-PON2), etc., may represent different classifications with respect to speed. Each of these PON networks may utilize a specific wavelength (or color) in the optical domain. For example, a GPON system may use 1490 nm downstream, and 1310 nm upstream, and include speeds up to 2.5 GBps. An XGS-PON may use 1578 nm downstream, and 1270 nm upstream, and include speeds up to 10 GBps. An NG-PON2 may use 1596-1603 nm downstream, and 1528-1540 nm upstream, with speeds up to 80 GBps. Power testing of such wavelengths can be technically challenging due to the broad range of the wavelengths. It is also technically challenging to measure the power level of the downstream signal, as well as the power level of the upstream signal. This is because the upstream signals may be sent on an optical fiber towards the OLT, and the downstream signals may be sent on the same optical fiber towards the ONT.

In order to address at least the aforementioned technical challenges, the multi-wavelength power meter as disclosed herein may include a first connection to an OLT, and a second connection to an ONT (interconnected through a splitter in a pass through mode). The downstream signal from the OLT to a customer may be analyzed by the multi-wavelength power meter, and similarly, the upstream signal from the ONT to the central office may be analyzed by the multi-wavelength power meter.

As disclosed herein, since the upstream direction may include each customer being allotted a time for the upstream signal to send data, for the upstream direction, the multi-wavelength power meter may utilize a fixed wavelength filter to isolate a specified wavelength or wavelength range of the combined optical signals. Further, as disclosed herein, since the downstream direction may include each customer receiving the same downstream signal, for the downstream direction, the multi-wavelength power meter may utilize a tunable filter to selectively isolate a specified wavelength or wavelength range (or a plurality of specified wavelength ranges) of the combined optical signals.

With respect to the first coupler, light being transmitted through the multi-wavelength power meter may be decoupled to capture a relatively small part of light to minimize the pass through mode losses. Thus, the first coupler may separate optical signals from an OLT and an ONT. Further, the second coupler may combine the separated signals to enable measurement of upstream and downstream signals on a single fiber, so that a fixed and/or tunable filter arrangement may be used to isolate a specified wavelength or a wavelength range for power measurement.

FIG. 1 illustrates an architecture of a multi-wavelength power meter 100 (hereinafter referred to as "power meter 100"), according to an example of the present disclosure.

Referring to FIG. 1, the power meter 100 may include a first coupler 102 to separate optical signals from an optical line terminal 104 (also denoted OLT 104) and an optical network terminal 106 (also denoted ONT 106) to ascertain a reduced percentage of total power related to the optical signals.

According to examples disclosed herein, the first coupler 102 may include a 1:n coupler, where n is greater than one. For example, the first coupler 102 may include a 1:10 coupler. The 1:10 coupler may provide for capture of 10% of the total power of the optical fibers at the input end of the coupler.

A second coupler 108 may receive the separated optical signals. The second coupler 108 may combine the separated optical signals. Further, the second coupler 108 may output the combined optical signals to an optical fiber 110. According to examples disclosed herein, the optical fiber 110 may include an optical fiber 110(1), an optical fiber 110(2), and generally, optical fibers 110(1)-110(n).

Figure 2:
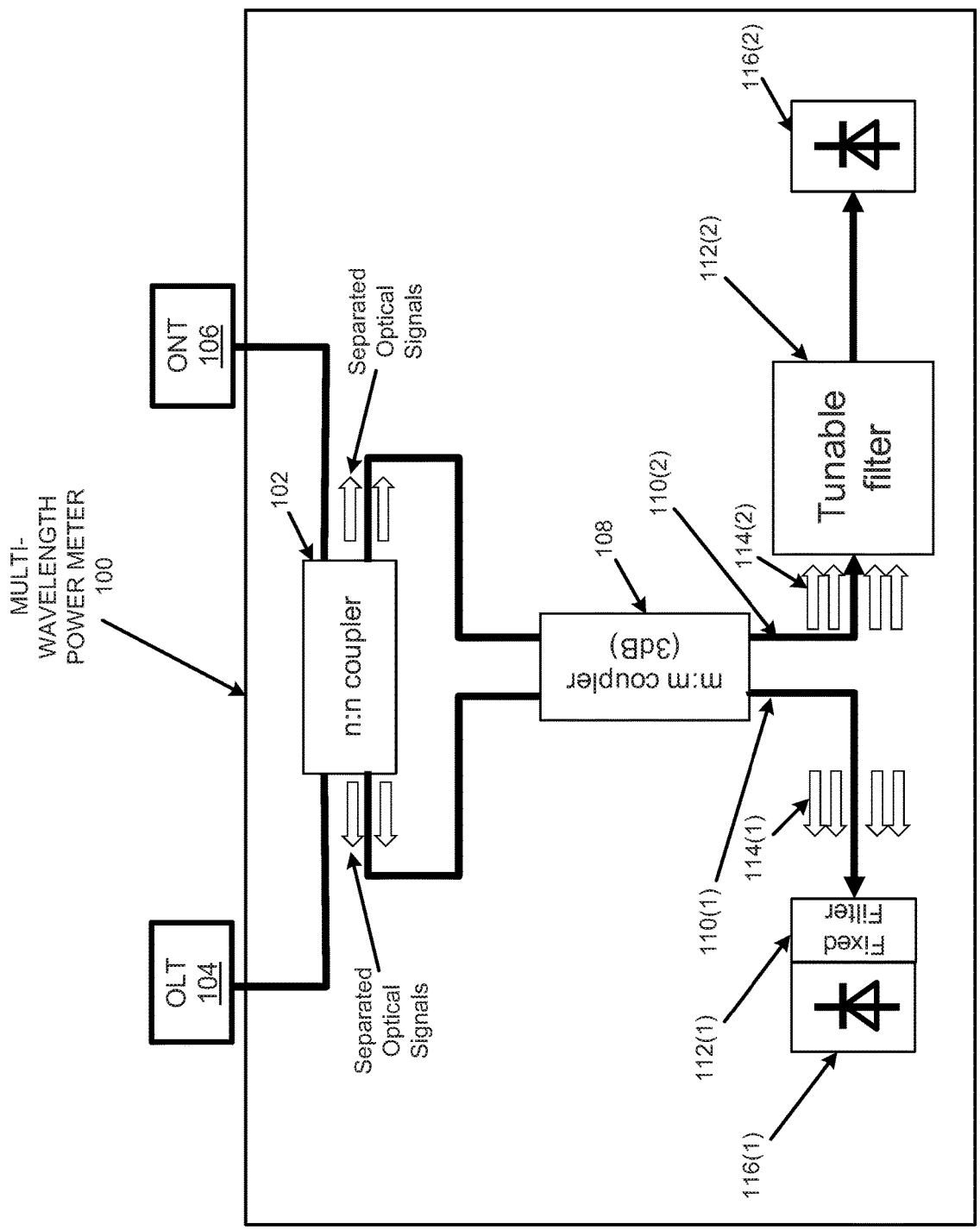
FIG. 2 illustrates another architecture of the multi-wavelength power meter, according to another example of the present disclosure.
Figure 3:
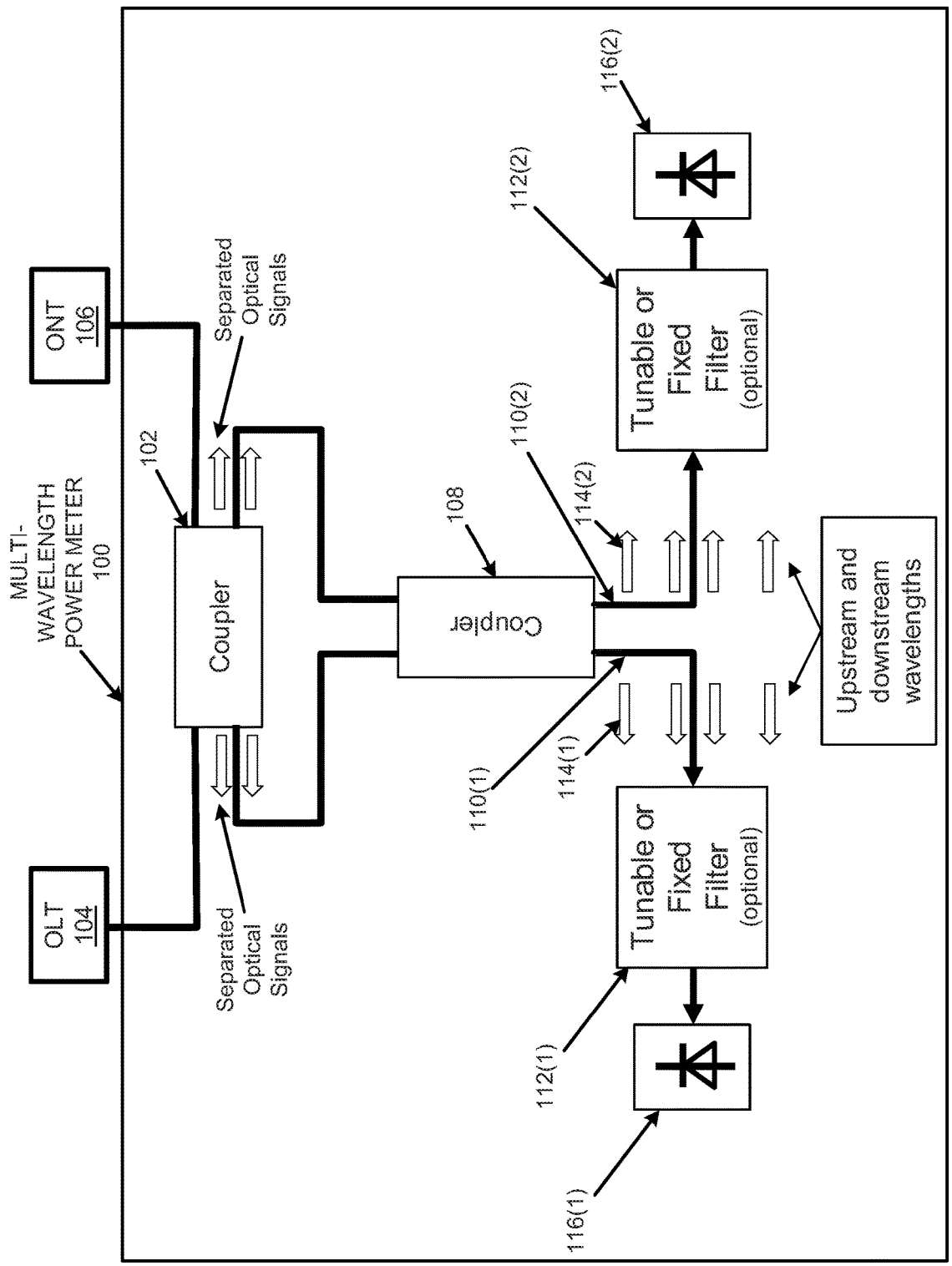
FIG. 3 illustrates another architecture of the multi-wavelength power meter, according to another example of the present disclosure.

For example, as shown in FIG. 1, the optical fiber 110 may include a single optical fiber. As shown in FIG. 2, the optical fiber 110 may include an optical fiber 110(1) and an optical fiber 110(2). Similarly, as shown in FIG. 3, the optical fiber 110 may include an optical fiber 110(1) and an optical fiber 110(2).

According to examples disclosed herein, the second coupler 108 may include an m:m coupler, where m is greater than one. For example, the second coupler 108 may include a 2:2 coupler. For the 2:2 coupler, both output branches of the coupler may show the same results.

A filter 112 may be communicatively connected to the optical fiber 110 to isolate at least one specified wavelength or wavelength range 114 of the combined optical signals. According to examples disclosed herein, the filter 112 may include a filter 112(1), a filter 112(2), and generally, filters 112(1)-112(n).

For example, as shown in FIG. 1, the filter 112 may include a single filter. As shown in FIG. 2, the filter 112 may include a filter 112(1) and a filter 112(2). Similarly, as shown in FIG. 3, the filter 112 may include a filter 112(1) and a filter 112(2).

According to examples disclosed herein, for the example of FIG. 1, the filter 112 may include a fixed wavelength filter to isolate the at least one specified wavelength or wavelength range 114 of the combined optical signals.

According to examples disclosed herein, for the example of FIG. 1, the filter 112 may include a tunable wavelength filter to selectively isolate the at least one specified wavelength or wavelength range 114 of the combined optical signals.

According to examples disclosed herein, the at least one specified wavelength or wavelength range 114 may include 1596-1603 nm or 1528-1540 nm of a NG-PON2 network. As disclosed herein, the at least one specified wavelength or wavelength range 114 may include any type of wavelength or wavelength range that may be used for data or other transmission purposes.

According to examples disclosed herein, the filter 112 may include a tunable wavelength filter that is tunable to a range of 1595-1625 nm. Such a tunable filter may isolate wavelengths in the range of 1595-1603 nm for a time and wavelength division multiplexed (TWDM) PON network, 1605-1625 nm for a point-to-point (PtP) network, etc.

According to examples disclosed herein, for the examples of FIGS. 2 and 3, the filter 112 may include a first filter (e.g., filter 112(1)) to isolate, for an upstream direction (e.g., see FIG. 2) associated with one of a plurality of optical fibers (e.g., an optical fiber 110(1)), at least one specified wavelength or wavelength range of the combined optical signals for power measurement of the at least one specified wavelength or wavelength range. Further, the filter 112 may include a second filter (e.g., filter 112(2)) to isolate, for a downstream direction (e.g., see FIG. 2) associated with another one of the plurality of optical fibers (e.g., an optical fiber 110(2)), at least one different specified wavelength range of the combined optical signals for power measurement of the at least one different specified wavelength or wavelength range.

For example, the first filter (e.g., filter 112(1)) may include a fixed wavelength filter (e.g., see FIG. 2) to isolate, for the upstream direction associated with the one of the plurality of optical fibers, the at least one specified wavelength or wavelength range of the combined optical signals for power measurement of the at least one specified wavelength or wavelength range. Further, the second filter (e.g., filter 112(2)) may include a tunable wavelength filter (e.g., see FIG. 2) to selectively isolate, for the downstream direction associated with the other one of the plurality of optical fibers, the at least one different specified wavelength or wavelength range of the combined optical signals for power measurement of the at least one different specified wavelength or wavelength range.

According to examples disclosed herein, for the example of FIG. 3, the first filter (e.g., filter 112(1)) may include a fixed or tunable wavelength filter. Similarly, for the example of FIG. 3, the second filter (e.g., filter 112(2)) may include a fixed or tunable wavelength filter. In this regard, in a similar manner as in FIG. 2 where the combined optical signals for the optical fiber 110(1) are identical to the combined optical signals for the optical fiber 110(2), in FIG. 3, the combined optical signals for the optical fiber 110(1) may be identical to the combined optical signals for the optical fiber 110(2). In FIG. 3, compared to FIG. 2 where the filter 112(1) includes a fixed wavelength filter, the filter 112(1) of FIG. 3 may be a fixed or tunable wavelength filter to provide for fixed or selective isolation of the at least one specified wavelength or wavelength range. Further, in FIG. 3, compared to FIG. 2 where the filter 112(2) includes a tunable wavelength filter, the filter 112(2) of FIG. 3 may be a fixed or tunable wavelength filter to provide for fixed or selective isolation of the at least one different specified wavelength or wavelength range.

According to examples disclosed herein, for the upstream direction, the at least one specified wavelength or wavelength range isolated by the first filter may include 1528-1540 nm of a NG-PON2 network. Further, for the downstream direction, the at least one different specified wavelength or wavelength range isolated by the second filter may include 1596-1603 nm of a NG-PON2 network.

According to examples disclosed herein, for the example of FIG. 2, the filter 112(1) may include a fixed wavelength filter that includes a fixed range of 1524-1544 nm. Such a fixed wavelength filter may isolate wavelengths in the range of 1524-1544 nm for a TWDM PON network. Further, the filter 112(2) may include a tunable wavelength filter that is tunable to a range of 1595-1625 nm. Such a tunable filter may isolate wavelengths in the range of 1595-1603 nm for a TWDM PON network, 1605-1625 nm for a PtP network, etc.

A photodiode 116 may be communicatively connected to the filter 112 for power measurement of the at least one specified wavelength or wavelength range 114. According to examples disclosed herein, the photodiode 116 may include a photodiode 116(1), a photodiode 116(2), and generally, photodiodes 116(1)-116(n), which may respectively correspond to the filters 112(1)-112(n).

Referring again to FIGS. 1-3, the first coupler 102 may provide for the separation of the downstream and upstream signals, and the second coupler 108 may provide for the combining of these signals. In this regard, the fixed and/or tunable filters as disclosed herein may provide for streamlining of the measurement requirements of a specified wavelength.

Selection of a fixed and/or tunable filter as disclosed herein may be based on the availability of filters, and therefore, various filter combinations may be utilized for power sensing. In this regard, since the information available on any optical fiber connected to the output end of the second coupler 108 is identical independently of whether a single or multiple optical fibers are connected to the output end of the second coupler 108, selection of a fixed and/or tunable filter as disclosed herein may be based on the availability of such filters.

Figure 4:
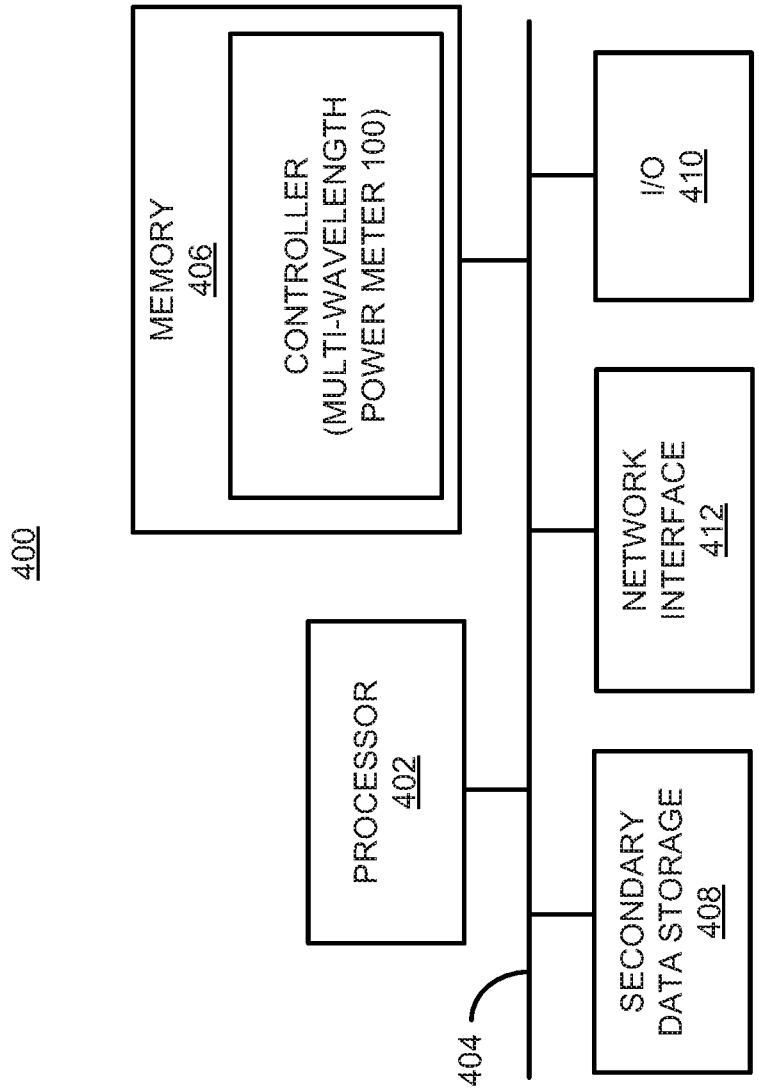
FIG. 4 illustrates a computer system, according to an example of the present disclosure.

FIG. 4 shows a computer system 400 that may be used with the examples described herein. The computer system may represent a generic platform that includes components that may be in a server or another computer system. The computer system 400 may be used as part of a platform for a controller of the power meter 100 of FIGS. 1-3. The computer system 400 may execute, by a processor (e.g., a single or multiple processors) or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 400 may include a processor 402 that may implement or execute machine readable instructions performing some or all of the methods, functions and other processes described herein. Commands and data from the processor 402 may be communicated over a communication bus 404. The computer system may also include a main memory 406, such as a random access memory (RAM), where the machine readable instructions and data for the processor 402 may reside during runtime, and a secondary data storage 408, which may be non-volatile and stores machine readable instructions and data. The memory and data storage are examples of computer readable mediums. The memory 406 may include the controller of the power meter 100 of FIGS. 1-3, including machine readable instructions residing in the memory 406 during runtime and executed by the processor 402.

The computer system 400 may include an I/O device 410, such as a keyboard, a mouse, a display, etc. The computer system may include a network interface 412 for connecting to a network. Other known electronic components may be added or substituted in the computer system.

The processor 402 may be designated as a hardware processor. The processor 402 may execute operations associated with various components of the power meter 100. For example, the processor 402 may execute operations associated with the controller of the power meter 100 of FIGS. 1-3, etc.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A multi-wavelength power meter comprising:
a coupler to separate optical signals from an optical line terminal and an optical network terminal to ascertain a reduced percentage of total power related to the optical signals, wherein the separated optical signals are combined to generate combined optical signals and output to a common filter to isolate at least one specified wavelength or wavelength range of the combined optical signals; and
a photodiode communicatively connected to the filter for power measurement of the at least one specified wavelength or wavelength range.

2. The multi-wavelength power meter according to claim 1, wherein the coupler includes a 1:n coupler, where n is greater than one.

3. The multi-wavelength power meter according to claim 1, wherein the filter includes a fixed wavelength filter to isolate the at least one specified wavelength or wavelength range of the combined optical signals.

4. The multi-wavelength power meter according to claim 1, wherein the filter includes a tunable wavelength filter to selectively isolate the at least one specified wavelength or wavelength range of the combined optical signals.

5. The multi-wavelength power meter according to claim 1, wherein the at least one specified wavelength or wavelength range includes 1596-1603 nm or 1528-1540 nm of a next generation-passive optical network (NG-PON2).

6. A multi-wavelength power meter comprising:
a coupler to separate optical signals from an optical line terminal and an optical network terminal to ascertain a reduced percentage of total power related to the optical signals, wherein the separated optical signals are combined to generate combined optical signals and both output to a first filter to isolate at least one specified wavelength or wavelength range of the combined optical signals, and a second filter to isolate at least one different specified wavelength or wavelength range of the combined optical signals;

a first photodiode communicatively connected to a first filter for power measurement of the at least one specified wavelength or wavelength range; and a second photodiode communicatively connected to a second filter for power measurement of the at least one different specified wavelength or wavelength range.

7. The multi-wavelength power meter according to claim 6, wherein the coupler includes a 1:n coupler, where n is greater than one.

8. The multi-wavelength power meter according to claim 6, wherein the first filter includes a fixed wavelength filter to isolate the at least one specified wavelength or wavelength range of the combined optical signals.

9. The multi-wavelength power meter according to claim 6, wherein the second filter includes a tunable wavelength filter to selectively isolate the at least one different specified wavelength or wavelength range of the combined optical signals.

10. The multi-wavelength power meter according to claim 6, wherein, for an upstream direction, the at least one specified wavelength or wavelength range isolated by the first filter includes 1528-1540 nm of a next generation-passive optical network (NG-PON2).

11. The multi-wavelength power meter according to claim 6, wherein, for a downstream direction, the at least one different specified wavelength or wavelength range isolated by the second filter includes 1596-1603 nm of a next generation-passive optical network (NG-PON2).

12. A computer implemented method comprising:
separating, by a coupler, optical signals from an optical line terminal and an optical network terminal to ascertain a reduced percentage of total power related to the optical signals;
combining the separated optical signals to generated combined optical signals;
isolating, by a filter, at least one specified wavelength or wavelength range of the combined optical signals; and
measuring, by a photodiode communicatively connected to the filter, power of the at least one specified wavelength or wavelength range.

13. The computer implemented method according to claim 12, wherein the coupler includes a 1:n coupler, where n is greater than one.

14. The computer implemented method according to claim 12, further comprising:
isolating, by the filter that includes a fixed wavelength filter, the at least one specified wavelength or wavelength range of the combined optical signals.

15. The computer implemented method according to claim 12, further comprising:
selectively isolating, by the filter that includes a tunable wavelength filter, the at least one specified wavelength or wavelength range of the combined optical signals.

16. The computer implemented method according to claim 12, wherein the at least one specified wavelength or wavelength range includes 1596-1603 nm or 1528-1540 nm of a next generation-passive optical network (NG-PON2).

17. The computer implemented method according to claim 12, further comprising:
specifying the at least one specified wavelength or wavelength range for an upstream direction of the combined optical signals; and
specifying a different wavelength or wavelength range for a downstream direction of the combined optical signals.

* * * * *